Figure 1:
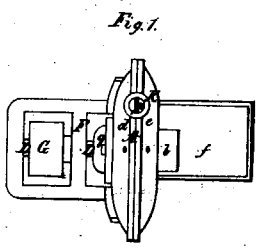

W. Ball,

Centrifugal Pump,

No. 276.

Reissued Sept. 12, 1854.

Witnesses:

Sam'l Cooper

John S. Clow

Inventor:

Wm Ball.

UNITED STATES PATENT OFFICE.

WILLIAM BALL, OF CHICOPEE, MASSACHUSETTS.

ROTARY PUMP.

Specification forming part of Letters Patent No. 8,602, dated December 23, 1851; Reissue No. 276, dated September 12, 1854.

*To all whom it may concern:*

Be it known that I, WILLIAM BALL, of Chicopee, in the county of Hampden and State of Massachusetts, have invented a new and useful improvement in rotary pumps or machines for elevating from a lower to a higher level a mixture of water or liquid and auriferous sand or other mineral matters in a state of comminution; and I do hereby declare that the same is fully described and represented in the following specification and accompanying drawings, letters, figures, and references thereof.

In conveying from a machine for washing ores to an amalgamating-machine water charged with auriferous sand or gravel, a rotary pump or elevating apparatus is found very convenient, as it avoids the necessity of placing the washing-machine at a level above the top of the amalgamator. A machine such as I have heretofore used consisted of a circular drum or chamber having a fan-wheel revolving in it, and so arranged or constructed as to receive the mixture of water and earthy particles through the central part of one side of the chamber, and drive or throw it up through a pipe leading out of the top or periphery of the drum. As of necessity the axle or shaft of the rotating fan-wheel must pass through and rotate in one side of the drum or case, it has been found that it, or the hole through which it passes, soon becomes worn to such extent as to enable much of the sand and water to escape out of the pump and through the said hole or space between it and the shaft, such wear often being so great as to create a serious waste when auriferous sand is running through the pump, such waste often amounting to two or three dollars' worth of gold per day.

The wear of the various parts of the pump, in consequence of the sand or gritty particles becoming introduced between various parts of the still and moving surfaces of the pump, has been a serious evil, and which it is the object of my improvement or improvements to prevent to a very great degree. It was also found that the sharp sand and pulverized quartz carried round with the water were thrown with such force against the interior of the pump that the casing was very soon worn through and the pump required to be entirely renewed, occasioning both delay and expense.

To remedy this inconvenience is the object of the second part of my invention, which consists in protecting the interior of the pump by a lining which is made thickest upon those parts which are exposed to the most wear, and which, when destroyed, may be replaced with but very little expense or delay.

To enable others skilled in the art to make and use my invention, I will proceed to describe the method which I have adopted of carrying it out.

Figure 3:
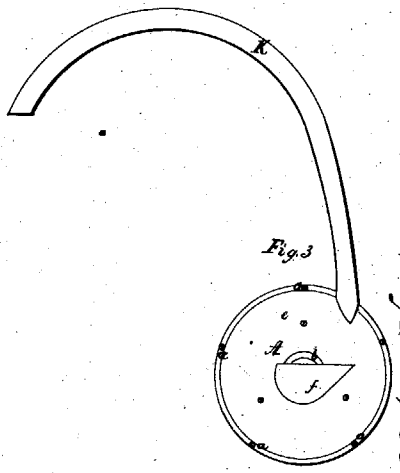
Figure 4:
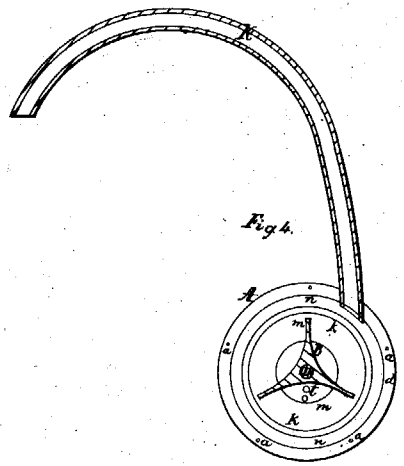
Figure 5:
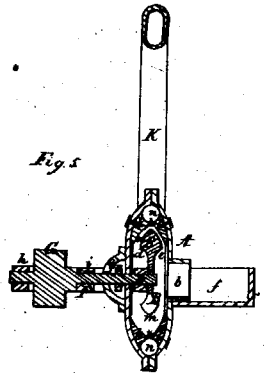
Figure 2:
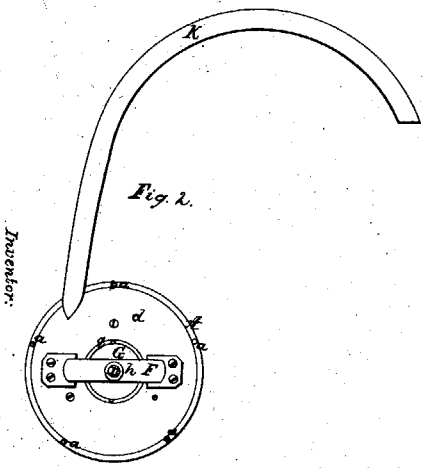

Figure 1 of the aforementioned drawings represents a top view of one of my improved ore pumps or elevators. Fig. 2 is a view of one side of it. Fig. 3 is a view of the other side of it. Fig. 4 is a vertical central and longitudinal section of it, and Fig. 5 is a vertical central and transverse section of it.

In the said drawings, A denotes the outer case of the pump, which case is composed of of two meniscus-shaped plates, *d e*, placed and confined together with their convexities outward, or in opposite directions to each other. They have flanged peripheries that are confined together by screws *a a*, &c. An induction opening or passage, *b*, is made through the central part of one of the plates—viz., *e*—which opening leads out of a hopper or trough, *f*, that is cast or formed on the side of the part *e*, and so made as to be capable of receiving the liquid auriferous mud and allowing it to flow into the passage *b*, such mud or mixture of ore and water being conveyed into the trough *f* by means of a spout leading from the stamps. A fan-wheel, B, plays or rotates within the case A, it being mounted on an axle, D, which extends through the central part of the disk *d*, and is supported in bearings *h i*, made on a frame, F, which is secured to the outside of the case A, or placed as seen in the drawings. The said axle or shaft has a driving-pulley, G, fixed on it, around the periphery of which pulley an endless belt from a driving-drum is made to play or run. To the internal surface of each disk I screw or affix a circular metallic ring, *k* or *l*, which has a form in cross-section, as seen in Fig. 5, and is secured to the disk or interior casing of the pump by screws or otherwise. These rings are so formed as to contract the interior of the pump-chamber so as to leave but a small space between them and the revolving fan. In Fig.

this space is represented as slightly enlarged by the attrition of the sand, as before mentioned. When this wear has increased the distance between the fan and the rings, so as to impair the operation of the pump, and before the main shell of the pump is injured, the rings *k l* and the fan-wheel B are replaced by others, and the pump is again in as perfect working order as when first constructed. It will be perceived that this contrivance entirely removes the difficulty heretofore experienced, the body of the pump being entirely relieved from the great wear to which it was formerly subjected by the rotation of the sand. The rings *h* and *l* divide the internal part of the case A into two concentric chambers, *m n*, which are connected together by a very thin space, *p*, left between the two rings. The fan-wheel B rotates within the inner chamber, *m*, the form of the fans being represented in the drawings, they being of a lozenge shape, or approximation thereto. Out of the external chamber and tangentially to it, or thereabout, I carry the discharge-pipe K. The object of the two chambers *m n*, connected by a thin passage just wide enough to allow the requisite quantity of the sandy liquid to flow through it, is to prevent wear of the joint or packing between the two plates *d e*, for it is found that without some such an arrangement or means the rapid rotation of the water and sand in the case A, caused by the fan-wheel, will very soon wear out the packing and the joint.

In my improved pump the greater part of the rotation of the liquid takes place within the inner chamber, while the liquid in the outer concentric chamber, in consequence of the back-pressure of the column of water in the discharge-pipe, scarcely revolves, or does so to so small an extent as to do no very material damage to the outer packing or joint of the plates of the case A.

Closely surrounding the axle or shaft D, (but not sufficiently tight to prevent the rotation of the shaft,) and against the plate or disk *d* of the case A, I make a chamber, *q*, and within the said chamber and on the shaft I place and fix a small collar, *r*, whose side is nearly in contact with the side of the case *a*.

At the bottom of the chamber *q*, and through the plate *d* of the case A, I make a small hole or passage, *t*, leading from the chamber into the case A.

Whatever water and auriferous sand that may work through the shaft-hole of the case A will flow against and be caught by the collar *r* during its rapid revolutions and be thrown toward and off the periphery of the wheel and against the contiguous surface of the chamber *q*, and from thence will descend toward and pass or be sucked through the passage *t* and into the case A. The collar *r* thus prevents the water and sand from coming in contact with that part of the chamber *q* which is immediately contiguous to and surrounding the axle, and thereby not only prevents wear of the shaft-hole of the chamber, but the escape of the fluid and sand, and consequent loss of gold or metal.

I claim—

1. The improvement by which the waste auriferous or earthy water that leaks out of the shaft-hole of the case A is saved and returned into the body of the case, and the wear of the shaft-hole of the chamber *q* prevented, the said improvement consisting in the chamber *q*, the collar *r*, and the passage *t*, as combined together, connected with the case A and the shaft of the fan-wheel, and made to operate substantially as specified.

2. The rings *k l*, as constructed and applied to the interior of the pump, for the purpose set forth.

WM. BALL.

Witnesses:
SAM. COOPER,
JOHN S. BLOW.